United States Patent
Ducrée et al.

(10) Patent No.: US 9,295,990 B2
(45) Date of Patent: Mar. 29, 2016

(54) MICROFLUIDIC VALVE

(75) Inventors: Jens Ducrée, Ashbourne (IE); Robert Gorkin, Exton, PA (US); Charles Nwankire, Brooklyn, NY (US)

(73) Assignee: DUBLIN CITY UNIVERSITY, Dublin (IE)

( * ) Notice: Subject to any disclaimer, the term of this patent is extended or adjusted under 35 U.S.C. 154(b) by 50 days.

(21) Appl. No.: 14/123,731

(22) PCT Filed: Jun. 1, 2012

(86) PCT No.: PCT/EP2012/060434
§ 371 (c)(1),
(2), (4) Date: Feb. 26, 2014

(87) PCT Pub. No.: WO2012/164086
PCT Pub. Date: Dec. 6, 2012

(65) Prior Publication Data
US 2014/0224349 A1  Aug. 14, 2014

(30) Foreign Application Priority Data

Jun. 3, 2011 (GB) .................................. 1109302.8

(51) Int. Cl.
*B01L 3/00* (2006.01)
*F16K 99/00* (2006.01)

(52) U.S. Cl.
CPC ........... *B01L 3/567* (2013.01); *B01L 3/502723* (2013.01); *B01L 3/502738* (2013.01); *F16K 99/003* (2013.01); *F16K 99/0015* (2013.01); *F16K 99/0063* (2013.01); *B01L 2200/0621* (2013.01); *B01L 2300/0803* (2013.01); *B01L 2400/0409* (2013.01); *B01L 2400/0677* (2013.01); *B01L 2400/0683* (2013.01); *B01L 2400/0694* (2013.01); *F16K 2099/0084* (2013.01); *Y10T 137/1692* (2015.04)

(58) Field of Classification Search
CPC .............. B01L 3/567; B01L 3/502738; B01L 3/502723; F16K 99/003; F16K 99/0063; F16K 99/0015; F16K 2099/0084; F16K 2400/0694; F16K 2400/0683; F16K 2200/0621; F16K 2400/0677; F16K 2400/0409
See application file for complete search history.

(56) References Cited

U.S. PATENT DOCUMENTS

| | | | |
|---|---|---|---|
| 6,719,682 B2 | 4/2004 | Kellogg et al. | |
| 2005/0106713 A1* | 5/2005 | Phan ................. | B01L 3/502738 435/287.2 |

(Continued)

FOREIGN PATENT DOCUMENTS

WO  2006/044841 A2  4/2006

OTHER PUBLICATIONS

Au et al., "Microvalves and Micropumps for BioMEMS," *Micromachines* 2:179-220, 2011.

(Continued)

*Primary Examiner* — Lore Jarrett
(74) *Attorney, Agent, or Firm* — Seed IP Law Group PLLC

(57) ABSTRACT

Microfluidic devices and in particular microfluidic devices incorporating a valve for selectively controlling the flow of a fluid within the microfluidic device are described. Specific examples of a microfluidic device are described, comprising a sacrificial valve, desirably one that is dissolvable on contact with a fluid or that is configured to disintegrate or dissolve on experiencing a predetermined pressure.

40 Claims, 13 Drawing Sheets

(56) References Cited

U.S. PATENT DOCUMENTS

| | | |
|---|---|---|
| 2006/0078462 A1 | 4/2006 | Jiang et al. |
| 2009/0166562 A1 | 7/2009 | Atkin |
| 2010/0093019 A1 | 4/2010 | Ditcham et al. |

OTHER PUBLICATIONS

Gorkin et al., "Rotationally Controlled Centrifugo-Pneumatic Valving Utilizing Dissolvable Films," *Transducers '11*, Beijing, China, Jun. 5-9, 2011, pp. 1276-1279.

Mark et al., "Aliquoting Structure for Centrifugal Microfluidics Based on a New Pneumatic Valve," *MEMS 2008*, Tucson, Arizona, Jan. 13-17, 2008, pp. 611-614.

International Search Report, mailed Nov. 5, 2012, for PCT/EP2012/060434, 6 pages.

Written Opinion, mailed Nov. 5, 2012, for PCT/EP2012/060434, 12 pages.

Bundgaard et al., "A Simple Opto-Fluidic Switch Detecting Liquid Filling in Polymer-Based Microfluidic Systems," *Transducers & Eurosensors '07, the 14$^{th}$ International Conference on Solid-State Sensors, Actuators and Microsystems*, Lyon, France, Jun. 10-14, 2007, pp. 759-762.

\* cited by examiner

Loading      Gas/Liquid Inversion      Emptying

MICROFLUIDIC VALVE

FIELD

The present application relates to microfluidic devices and in particular to microfluidic devices incorporating a valve for selectively controlling the flow of a fluid within the microfluidic device. The invention more particularly relates to a microfluidic device comprising a sacrificial valve.

BACKGROUND

Many key fluidic elements of integrated centrifugal microfluidic platforms (e.g., decanting, metering, mixing, siphoning) are either derived from or can be improved through valving technologies. Sacrificial valves are of particular interest, serving as superior liquid/vapour barriers that act as programmable flow control elements and offering novel capabilities like on-board reagent storage. Traditionally, these active valves necessitate embedding (fluidically/pneumatically) isolating materials and actuating those gating mechanisms through complex external triggers.

For example, one of the known valving techniques using a sacrificial material is wax valving, where small quantities of wax are embedded in a microchannel until actuated by a heat source which melts the wax and can allow for liquid to pass. In these setups the valving requires multiple pieces of equipment/processes to manufacture and actuate, i.e., a dispenser, which can melt the wax for initial placement and a heat source (resistive heater, laser, etc.) to melt the waxes during operation. Another sacrificial valving scheme is based on melting polymer films by a laser, typically aided by absorptive properties of the sacrificial material.

SUMMARY

These and other problems are addressed by a microfluidic device incorporating a sacrificial valve for selectively controlling the flow of a fluid within the microfluidic device.

By providing a sacrificial valve—desirably one that is dissolvable on contact with a fluid—the present teaching allows active valving that provides the strength of a physical barrier in a way that easily integrates with production techniques and eliminates the need for peripheral actuation mechanisms.

In accordance with one arrangement, a microfluidic device comprises a channel separated into first and second regions by presence of a valve comprising a sacrificial member within the channel. A liquid is provided in a first region of the channel upstream of the valve, the membrane providing a barrier to fluid flowing into the second region downstream of the valve. The device may be coupled to a drive mechanism configured to induce flow in the liquid which operably drives the liquid towards the valve. By driving the liquid towards the valve, and desirably by effecting contact of the liquid with the sacrificial member, the sacrificial member dissolves and the fluid may then pass from the first to the second region.

In accordance with the preferred teaching the device is primed to include a gas pocket provided between the liquid and the sacrificial member of the valve. In the absence of an induced fluid flow, the gas pocket prevents liquid contact with the sacrificial member, i.e. the gas pocket provides a plug or buffer between the liquid and the sacrificial member. Typically the gas pocket is bordered at a first side by the meniscus of the liquid from the first region and at a second side by the sacrificial member.

By suitably configuring the device, e.g. adding a gas outlet in the vicinity of the valve or by varying the channel cross section in the region of the valve or on the basis of a degassing principle (in particular in a PDMS silicone substrate), the presence of the gas pocket between the liquid and the sacrificial member of the valve may be retained until such time as valve actuation is required. By increasing the induced pressure differential across the liquid from upstream or applying a suction pressure, the gas pocket will dissipate and the liquid will make contact with the valve causing it to dissolve. The speed of actuation of the valve is therefore dependent on the rate of breakdown of the gas pocket and the subsequent dissolution rate of the valve.

In a second arrangement, the gas pocket is operably retained in place between the advancing liquid (meniscus) and the valve and will remain in place until such time as the pressure exerted by the gas pocket against the meniscus of the liquid exceeds forces such as surface tension which tend to preserve the integrity of the liquid plug. By operably destabilizing the meniscus such as, for example, by providing elevated pumping pressures, it is possible to bring the liquid into contact with the valve, effectuate the wetting and following dissolution of the valve.

In another configuration drive means provides centrifugally/rotationally induced artificial gravity conditions whereby a destabilization of the meniscus may, for instance, be induced by elevating the spinning frequency beyond a critical threshold. In this implementation, there are two time constants governing the opening of the valve. The first one can be freely programmed by selecting the point in time when the liquid is to protrude towards the valve. The second one is governed by the dissolution time of the valve itself.

In a first configuration the first and second regions of the channel are provided as first and second layers in a multilayer microfluidic device. Each of the regions are in fluid communication with one another through a vertical through hole, the valve being located within or adjacent to the through-hole and preventing passage of a liquid through the through-hole.

In one aspect the valve comprises a thin film structure. This may be provided as a single layer of a dissolvable film. The dissolvable film may be provided as an aqueous polymer matrix comprising one or more of various cellulose derivatives, hydrocolloids, acrylate copolymers, gums, polysaccharides, plasticizers or the like.

In another aspect the valve comprises a sacrificial member that is configured to disintegrate or dissolve on experiencing a predetermined pressure. Such pressure may be exerted from the liquid (plug) provided upstream of the valve, the liquid being biased towards the valve by the drive means. Such a configuration may utilise a sacrificial member in the form of a membrane that may open or otherwise be disrupted by pressure exerted by the liquid plug on the gas pocket. This would not require a dissolvable film, but just a thin film that would break if exposed to a certain pressure. Typically the mechanism of such an arrangement would be a mechanical breaking of the membrane resultant from the hydrostatic pressure exerted by the upstream liquid.

Also a combination of effects may contribute to valve opening. For instance, the dissolution of the dissolvable membrane may be accelerated by the stress induced by the pressure drop across the membrane. In another possible valving mechanism, a pneumatically induced partial disruption of a dissolvable membrane lets the entrapped air escape from the pneumatic chamber. The partially disrupted membrane is then dissolved by the inflowing liquid to fully open the passageway.

Another embodiment would be a sacrificial membrane displaying a finite flow resistance for the gas. In this case the entrapped gas would continuously escape the compression chamber through the membrane until it is contacted and then dissolved by the incoming liquid. This mechanism would offer the function of a rotationally controlled delay element.

In certain configurations a multi-layer functional film configuration may be utilised to fabricate a valve. Such a multi-layer construct may comprise a first layer comprising a pressure sensitive adhesives film (PSA films) and a second layer of a dissolvable film which may be adhered to or otherwise provided on the PSA. To fabricate, the PSA film may be provided as a single sheet which is outlined with through holes cut using a cutter-plotter machine. The secondary layer consisting of a specialized dissolvable film may then be pressed on the PSA. These tabs are then cut from the complete assembly.

Embedding the assembly within the channel of the microfluidic device creates the valves; the tacky nature of the PSAs allows for closing off microchannels by simply sticking the assembly into the system features. Once prepared, the valves remain isolated; the valve is essentially in a "closed state" until liquids come into contact with the dissolvable film surface. Once liquids are pumped to the interface, after a determined period of time the film liquefies and the valve is in an "open state", further pumping will propel liquids through the valve site.

The use of the hybrid films for valving has applications for a range of microfluidic designs including both stationary and centrifugal arrangements. Particularly, centrifugal based systems are notably improved by dissolvable-film based valving; for example mixing, blood separation, metering, phase separation, dilution, on-board liquid storage, etc.

By providing a valve comprising dissolvable films to form efficient barriers for liquid flow; until the films are in direct contact with liquid reagents the fluidic seals between regions of the device are fully maintained. No separate actuation of the valve is required as the same pumping mechanism driving the flow also actuates the valve. The sacrificial valves described here are of particular interest for a range of applications; for example as programmable flow control elements and as vapour barriers for on-board liquid reagent storage.

These and other features will be better understood with reference to the following exemplary arrangements which are provided to assist in an understanding of the present teaching and in no way should be construed as limiting the scope to the specific examples which follow.

BRIEF DESCRIPTION OF THE DRAWINGS

The present application will now be described with reference to the accompanying drawings in which.

DETAILED DESCRIPTION OF THE DRAWINGS

The present teaching will now be described with reference arrangements of a valve and systems incorporating such a valve. It will be appreciated that these arrangements are provided purely to assist in an understanding of the present teaching and should not be construed as limiting in any fashion. Where one or more elements are described with reference to one or more figures it will be appreciated that such elements may be replaced or interchanged with other elements without departing from the present teaching.

Figure 1:
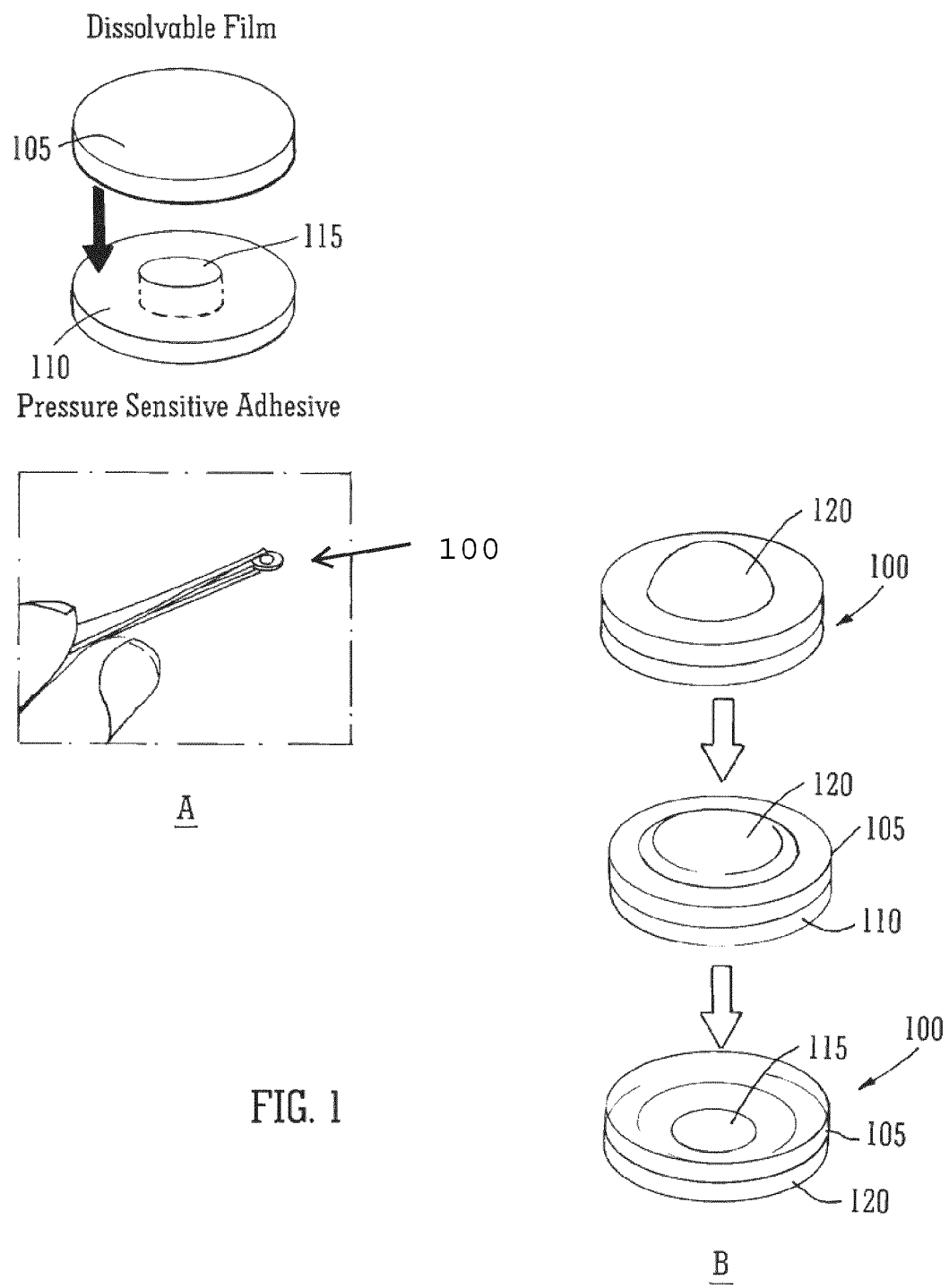
FIG. 1A is a schematic showing in exploded view a valve provided in accordance with the present teaching.
FIG. 1B is a schematic showing how contact of a fluid with the valve of FIG. 1A causes a sacrificial layer of the valve to dissolve allowing fluid communication between a first and second side of the valve.

FIG. 1 shows an exemplary construct of a valve 100 provided in accordance with the present teaching. The valve comprises a sacrificial layer 105—desirably one that is dissolvable on contact with a liquid—the layer typically being provided in the form of a thin film. The film is desirably of the type that prior to contact with a film will provide a barrier and once a liquid is introduced to the surface, the film will begin to dissolve, and a liquid can then pass through an aperture that was previously blocked by the film. The time delay between contact with a liquid and disintegration of the film may be controlled depending on the physical construct or makeup of the film and judicious selection of appropriate films can therefore be used to selectively control the time at which liquids can continue throughout a device comprising such a valve subsequent to initial contact with the valve.

The films are typically derived from an aqueous polymer matrix consisting of various cellulose derivatives, hydrocolloids, acrylate copolymers, gums, polysaccharides, plasticizers, etc., and the rate of dissolution depends on the mixture, a range of film dissolution times can be created and utilized.

Within the present disclosure two exemplary types of films will be discussed: a quick dissolving film (~10 seconds) and a slow dissolving film (~5 minutes). It will be appreciated that these are provided to illustrate the range of timescales that can be considered useful in the construct of a valve within the context of the present teaching but it is not intended to limit the present teaching to these values or type of film.

Figure 2:
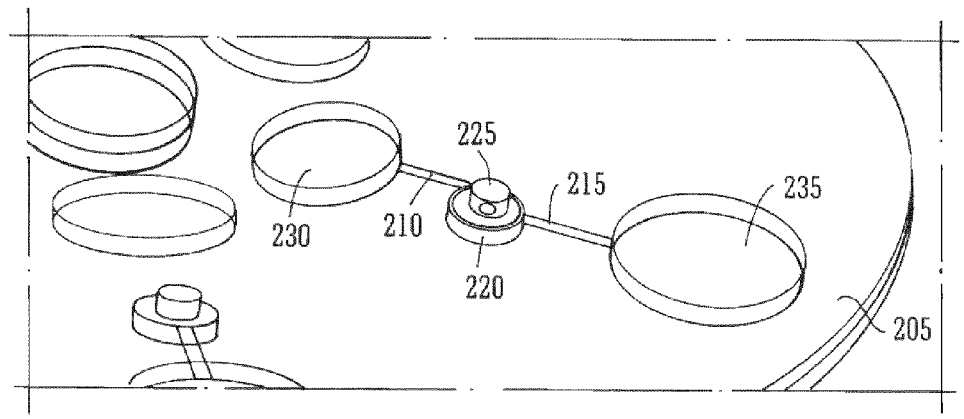
FIG. 2 shows an arrangement of a valve within a microfluidic device in accordance with the present teaching.

As will be clearer from FIG. 2, the valve 100 of the present teaching is desirably provided within a channel 200 of a microfluidic device 205. The valve 100 separates the channel into first 210 and second 215 regions. In a first configuration the valve is located within a valve seat 220 which has a cross-sectional area greater than the cross sectional areas of either of the first 210 or second 215 regions.

To locate the valve within the channel 200, the sacrificial layer 105 may be coupled to an adhesive layer 110. Where the sacrificial layer is formed by a thin dissolvable film, the coupling of that film to a second layer provides a multi-layer functional film valve configuration. A first layer of such a multi-layer construct is formed from the dissolvable film 105 which may be adhered to or otherwise provided on a pressure sensitive adhesives film 110 (PSA film) which forms a second layer of the assembly.

To fabricate such a multi-layer assembly, the PSA film may be provided as a single sheet which is outlined with through holes 115 cut using for example a cutter-plotter machine. The first layer consisting of the specialized dissolvable film may then be pressed on the PSA, as shown in FIG. 1. The combined assembly forms a tab which may then be cut from the complete sheet of multiple such tabs.

FIG. 1B shows how contact of a liquid 120 with the dissolvable layer 105 causes the layer to disintegrate thereby allowing the liquid to pass through the valve structure. In effect, prior to disintegration, the sacrificial layer 105 of the valve 100 provides a barrier to the through hole 115 that is formed in the PSA layer.

It will be appreciated that while it is desirable to form the second layer with some adhesive to allow for securing the valve within the channel, that other arrangements may dispense with the integral adhesive properties of the second layer and rely simply on its template or support functionality.

As shown in FIG. 2, embedding the valve assembly within the channel of the microfluidic device creates a barrier between the two regions of the channel; the tacky nature of the PSAs allows for closing off microchannels by simply sticking the tab that forms the valve assembly into the recess 220 that is formed within the microfluidic device to seat the valve. Once located, the through hole of the valve remains isolated; the valve is essentially in a "closed state" until liquids come into contact with the dissolvable film surface. Once liquids are pumped to the interface, after a determined period of time the film liquefies and the valve is in an "open state", further pumping will propel liquids through the valve site.

In operation a fluid is provided in a first region 210 of the channel upstream of the valve 100, the valve providing a barrier to fluid flowing into the second region 215 downstream of the valve. The microfluidic device 205 may be coupled to a drive mechanism configured to induce fluid flow in the fluid which operably drives the fluid towards the valve. On contact of the fluid with the valve, the valve dissolves and the fluid may then pass from the first to the second region.

In accordance with the preferred teaching the device 205 is primed to include a gas pocket provided between the liquid and the valve. In the absence of an induced flow, the gas pocket prevents liquid contact with the valve. The retention of a gas pocket is advantageously enabled within the context of the present teaching as the channels of the device are microfluidic in nature. In this way the cross-sectional area of the channels is very small and the dimensions are particularly appropriate for location and retention of gas pockets as for larger channel cross section the gas pocket may not remain stable within the channel such that the gas may escape through an cross sectional area of the channel not occupied by the liquid.

As will be discussed in more detail below when employed on a rotatable substrate such that liquid movement is induced by a centrifugal force, each valve will typically have an associated burst frequency. This is the frequency of rotation of the rotatable substrate at which the valve will actuate and allow fluid communication between the first and second regions. Where so employed, the device will typically further comprise control means to allow a control of the frequency of rotation of the rotatable substrate relative to the burst frequency. The burst frequency is related to both the time required to dissipate the gas pocket away from the sacrificial membrane and the dissolution rate of the membrane on contact with the liquid.

Figures 3A, 3B, 3C:
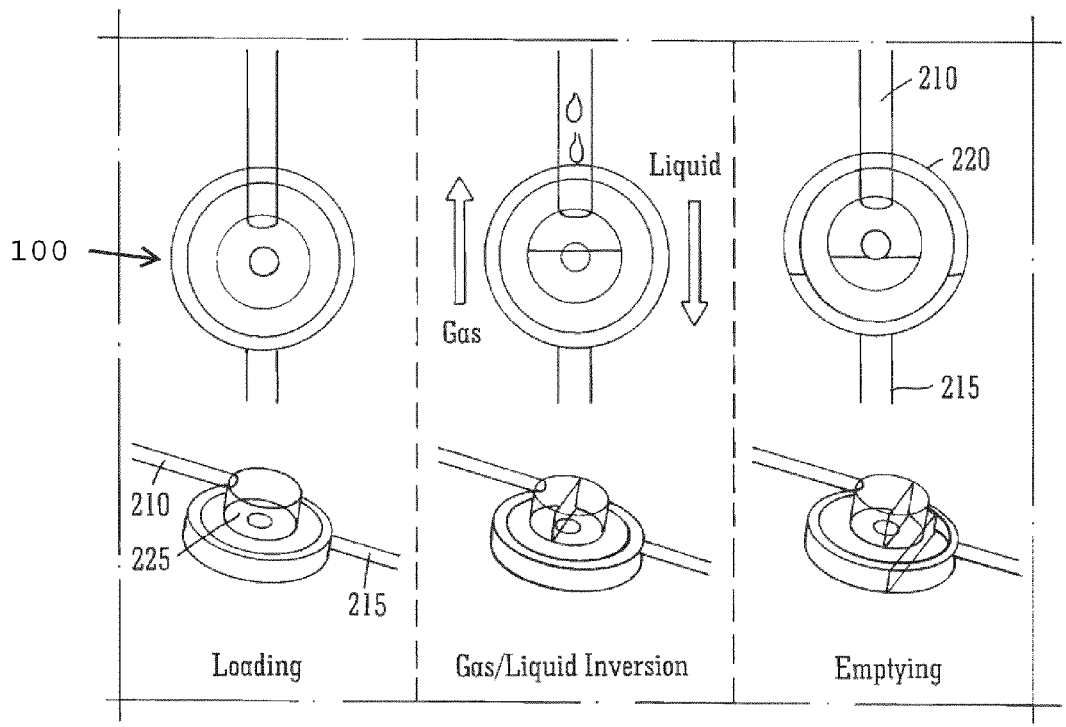
FIG. 3 shows in schematic form how the device of FIG. 2 can be actuated to cause fluid flow between first and second regions of a microchannel within the microfluidic device with FIG. 3A showing a loading of the device, FIG. 3B the formation of a gas liquid inversion and FIG. 3C the emptying of the first region through the valve.
FIG. 3D shows the formation of a gas chamber for allowing dissipation of gas within the gas pocket away from the sacrificial membrane
FIGS. 3E and 3F show examples of collection chamber downstream of the valve for collection of debris resultant from a dissolving of the sacrificial membrane.
FIG. 3G shows an example of how the sacrificial membrane may allow some percolation of gas through the membrane fabric to allow liquid within the first region to migrate towards and come into contact with the membrane.
FIG. 3H shows in schematic form how two valves provided within the context of the present teaching may be provided at different locations on a rotatable substrate.

It will be appreciated that the time required to dissipate the gas pocket will depend on the volume of gas in the gas pocket which is related to the dimensions of the channel housing said pocket. It will be understood that within the context of the present teaching that it is the microdimensions of the microfluidic device that allows the creation of a stable gas pocket in the first place. By suitably configuring the first region of the channel in the location upstream of the sacrificial membrane it is possible to ensure that once the device is primed a gas pocket will be formed between the sacrificial membrane and the advancing fluid within the first region. Effectively the introduction of a liquid into an entry port of the first region allows the liquid to advance within the first region. The advancing liquid migrates through the first region forcing gas forwardly of fluid. The gas will migrate towards the sacrificial membrane. The nature of the sacrificial membrane is such as to provide at least a time delay in gas migration through the membrane. In certain arrangements, the membrane will be gas impermeable preventing the passage of any gas through the fabric of the membrane. In other arrangement, the membrane 225 as shown in FIG. 3G will provide a flow resistance whereby gas 228 may over time percolate through the fabric of the membrane. In both circumstances, the membrane retards or stops completely the progression of the gas past the valve so as to ultimately form the gas pocket between the sacrificial membrane and the advancing fluid within the first region.

The volume of the gas pocket will have an effect on the time duration that will ultimately be required to dissipate the gas away from the sacrificial membrane and allow liquid contact the membrane. In accordance with certain aspects of the teaching the device may form part of a larger system that will incorporate means to measure in situ the dimensions and thus the volume of the gas pocket formed within the channel of the microfluidic device. An example of such measuring means comprises an opto-fluidic switch configured for detecting liquid filling in polymer-based microfluidic systems. Such an arrangement is described in F. Bundgaard, O. Geschke, R. Zengerle, and J. Ducrée. A simple opto-fluidic switch detecting liquid filling in polymer-based microfluidic systems. In *Proceedings of the* 14*th International Conference on Solid-State Sensors, Actuators & Microsystems* (Transducers 2007), June 10-14, Lyon, France, volume 1, pages 759-762, 2007, the content of which is incorporated herein by way of reference. It will be appreciated that the scanning arrangement of this described detection arrangement can be realised in a rotatable substrate—such as described herein for providing the drive means for inducing the centrifugal force for driving the liquid towards the sacrificial membrane.

In one arrangement the detection arrangement may be incorporated as a feedback component, such as may be provided by a closed-loop arrangement, of the system to allow one or more of:

1) Providing an indication of the fill of the microchannels so as to allow for an accurate determination of the length of the gas pocket and/or the liquid plug residing above it after priming. Knowing the length of these fluid segments may be useful in providing a feedback signal to the drive means to vary the frequency of rotation of the drive means commensurate with the dimensions of the gas pocket and/or liquid plug so as to accurately time the opening of the valve. In another use of monitoring of the defined dimensions of the gas pocket, in circumstances where the device is being primed with a liquid during rotation of the rotatable substrate then providing a real-time feedback of the fill will allow a tailoring of the volume of liquid introduced into the first region of the microchannel dependent on the desired length of the gas pocket.
2) In another configuration the detection arrangement can be usefully employed to accurately sense an opening of the valve. This can then be used to trigger other valve openings—in devices having a plurality of valves—by varying the rotation frequency of the substrate sufficiently to trigger other selected valves which have a different burst frequency to the just opened valve.

The principle in use by which the gas pocket dissipates may vary dependent on the configuration employed. In a first configuration by suitably configuring the device, e.g. adding a gas outlet in the vicinity of the valve or varying the channel cross section in the region of the valve or on the basis of a degassing principle (in particular in a PDMS silicone substrate), the presence of the gas pocket between the liquid and the valve may be retained until such time as valve actuation is required. By increasing the induced pressure, the gas pocket will dissipate and the fluid will make contact with the valve causing it to dissolve. The rate of actuation of the valve is therefore dependent on the rate of breakdown of the gas pocket and the subsequent dissolving rate of the valve. It will be appreciated that such a configuration is particularly useful for on-board reagent storage. In such an application it is desirable that the sacrificial membrane is selected to have specific vapour resistant properties. The significance of this resistance will however depend on the specifics of the intended storage conditions.

In another arrangement which is exemplified with reference to FIG. 2, a liquid-gas interface is provided within the device by the retained gas pocket and the liquid within the first region of the channel. It will be understood that this interface is effectively stable and will remain in-situ in the absence of an applied force to disrupt that stability. The stability is governed at least partially by the geometry and surface tension between the two adjacent fluid (liquid and gas) phases. Typically the gas pocket is operably retained in place between the advancing fluid and the valve and will remain in place until such time as the pressure pressing the liquid plug against the gas pocket supersedes a certain critical value. By operably destabilizing the meniscus such as for example by providing elevated pumping pressures it is possible to bring the fluid into contact with the valve, effectuate the wetting and following dissolution of the valve. In another configuration once the critical value is exceeded the membrane or thin film will mechanically break based on the experienced upstream pressure exerted by the fluid—either directly or through the action of the fluid on the gas pocket that contacts the membrane.

In the configuration of FIG. 2, the device is provided as a rotatable disc which is coupled to drive means which provide centrifugally induced artificial gravity conditions whereby a destabilization of the meniscus may, for instance, be induced by elevating the spinning frequency beyond a critical threshold. In this implementation, there are two time constants governing the opening of the valve. The first one can be freely programmed by selecting the point in time when the fluid is to protrude towards the valve. The second one is governed by the dissolution time of the valve itself. It will be appreciated that more complex devices than that described herein can be employed within the context of the present teaching. For example devices comprising two or more valves may be provided with each of the valves having different operating characteristics. As the valve actuation of a specific valve may be judiciously related to a frequency of rotation of the device, it is possible in accordance with the present teaching to provide multiple valving arrangements with actuation of specific valves being controlled by the spin frequency of the disc/rotor. In this way frequency thresholds can be introduced, and one or more reagents stored within the device can be slated to enter the reaction at a later stage and can be held back even through vigorous, high-frequency rotation and acceleration of the device as a whole.

In the arrangement of FIG. 2 the valve tab 100 is placed below the gas pocket or air ballast chamber 225 located between a loading 230 and a receiving chamber 235. The first region 210 of the channel extends from the loading 230 chamber and the second region 215 which is located downstream of the valve 100 enters into the waste 235 chamber. The first and second regions are in different horizontal planes from one another by forming the first and second regions of the channel as first and second layers in a multilayer microfluidic device, the first region being located above the second region. Each of the regions are in fluid communication with one another through a vertical through hole, the valve being located within or adjacent to the through-hole and preventing passage of a fluid through the through-hole.

While still intact, the valve forms a fluid barrier sealing the vertical through hole connecting two channel layers. As shown in FIG. 3A, when liquids are introduced to the loading chamber 230 and priming of the first region 210 of the microchannel takes place, a gas pocket 225 forms above the valve. The gas pocket is pressurized when a centrifugal field acts on the liquid plug ("valve closed"). At a critical spinning frequency, the inverted liquid-gas stack destabilizes and the liquid wets the film. This, in turn, will dissolve the sacrificial membrane of the first layer of the valve. The liquid can then protrude into the lower second region 215 of microchannel ("valve open").

Figure 3D:
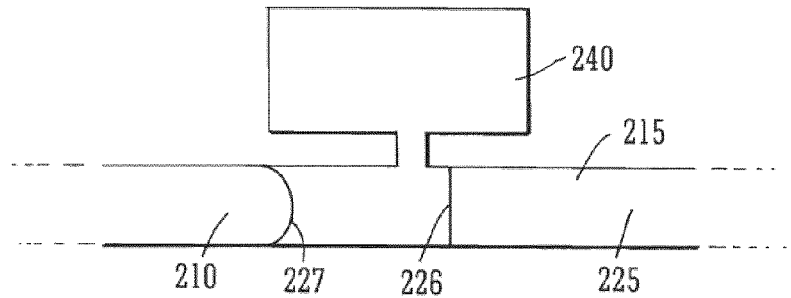

In another configuration, exemplified with reference to FIG. 3D, the device is configured to comprise a gas chamber 240 provided in fluid communication with the first region 215 of the microchannel but offset from the main axis of the microchannel. This secondary gas chamber 240 provides a gas outlet for gas within the gas pocket 225 such that the advancing fluid meniscus 227 will displace the gas towards the secondary chamber 240 and allowing the liquid to come into contact with the sacrificial membrane 226 causing it to dissolve.

Figure 3E:
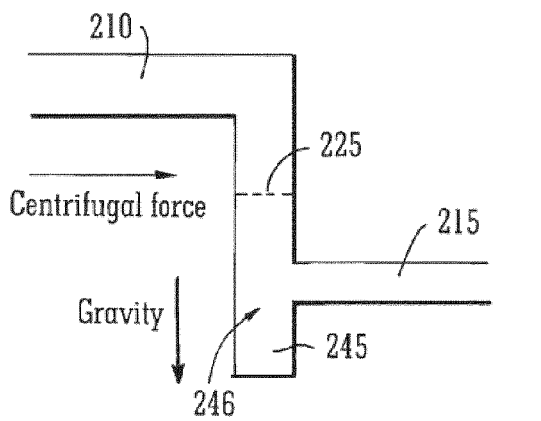
Figure 3F:
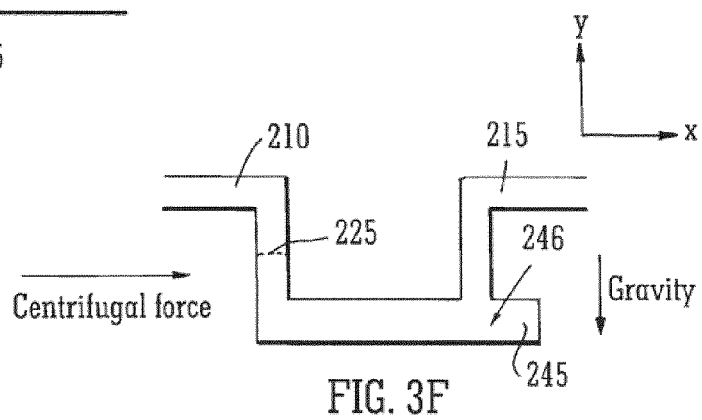
Figure 3G:
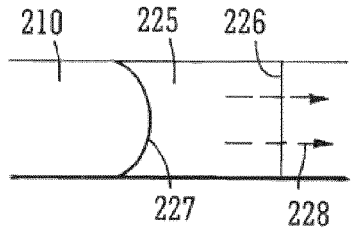

While it is believed that the sacrificial membrane will dissolve completely, the device may be configured to allow a collection of any residue that may result from the contact of the membrane with the liquid. FIGS. 3E and 3F show two alternatives examples where a debris chamber 245 is provided downstream of the valve location. These schematics are representative of a section through a multilayer device.

In the first configuration the chamber is provided having a mouth 246 parallel with the gravitational vector, the Y axis, and substantially perpendicular with the centrifugal force vector—the X axis, such that chamber extends into the device substrate at a distance greater than major axis of the second region.

On dissolving the membrane 225, any constituents will migrate with the advancing fluid into the chamber until the chamber is filled. Due to their heavier weight they will be preferentially retained within the chamber 245 under the action of gravity. Further liquid that passes through the channel will bypass the chamber in a laminar flow characteristic of microfluidic devices. Such an arrangement can be used to preferentially collect debris travelling within a first volume of liquid passed the opened valve and then preserve analysis for a second subsequent volume that passes passed the chamber 245 into the second region 215.

FIG. 3F shows an alternative configuration whereby the chamber 245 takes advantage of a biasing force resultant from the induced centrifugal force to force debris into and retain that debris within a blind channel which is offset from the second region. Liquid passing the valve carrying the debris encounters the chamber 245 at a corner of the microchannel. That first liquid passed the valve and carrying any debris will pass into the chamber, filling the previously empty volume. Subsequent liquid will encounter a filled volume and will then pass under laminar flow through to the second region 215 proper.

Figure 3H:
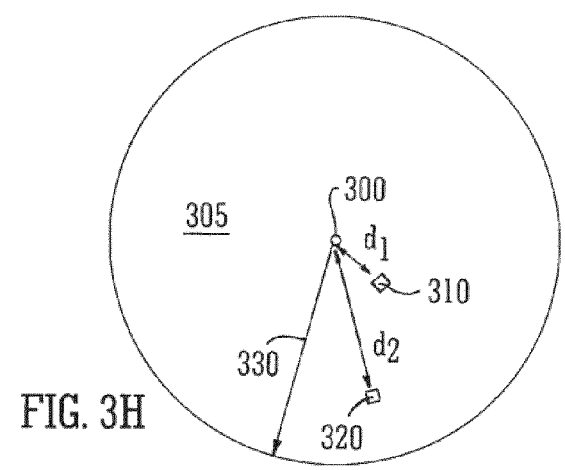

FIG. 3H shows an example of a microfluidic device having first 310 and second valves 320 provided on a rotatable substrate 305. The substrate is rotatable about an axis of rotation 300 and this rotation generates a centrifugal force that has force lines extending radially 330 out from the axis of rotation. Dependent on the distance d1, d2 of each of the first and second valves 310, 320 from the axis of rotation, the valves will experience a different frequency of rotation which can be usefully employed to stagger their opening.

Figure 4:
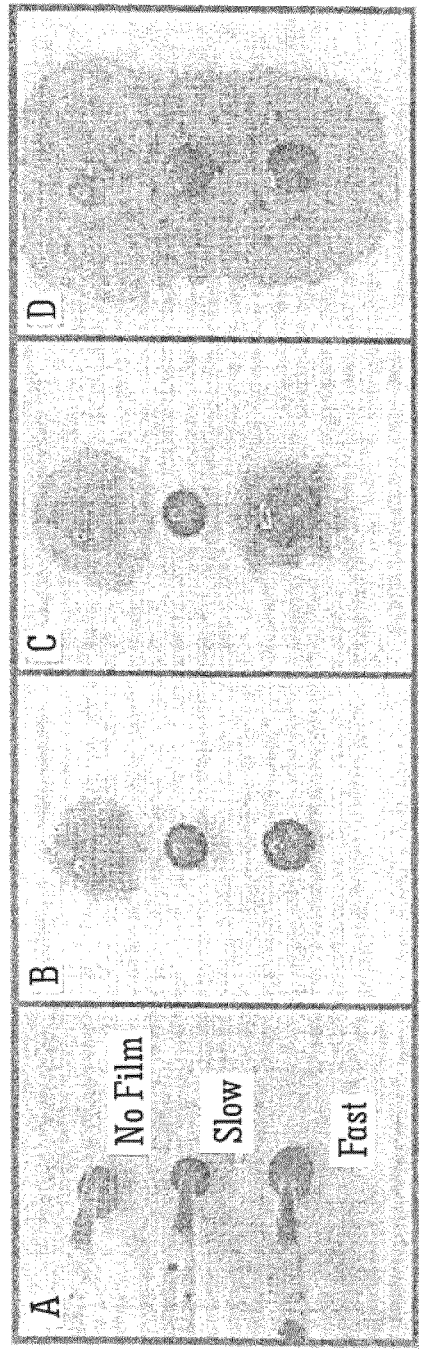
FIG. 4A) shows an arrangement with simultaneous loading of fluids, FIG. 4B) the liquid percolation through the device ~1 second after loading the through hole without film cover (No Film), FIG. 4C) shows how after ~10 seconds after loading the device, the quick dissolve film passes liquid and FIG. 4D) shows the passage through all three types approximately 5 minutes after loading.

Using the assembly method outlined previously, valving experiments with the valves comprising dissolvable films of both a fast and a slow dissolve characteristic were performed in microfluidic systems. Initially, sequential valving operations were demonstrated in vertical channels through chips. Using laser micromachining, simple structures consisting of three through-hole vials were created in Poly-methyl-methacrylate (PMMA) sheets. After fabrication, valve tabs with quick and slow dissolvable films were placed over two of the channels while one channel remained uncovered. Aqueous coloured dye (20 μL) was loaded directly to the center of the channel/valve and the rate for which the liquid penetrated the channel was observed. The results (FIG. 4) showed consecutive, timed release of liquids starting with the channel with no film and ending with the channel covered by the plug with the slow dissolve.

Figure 5:
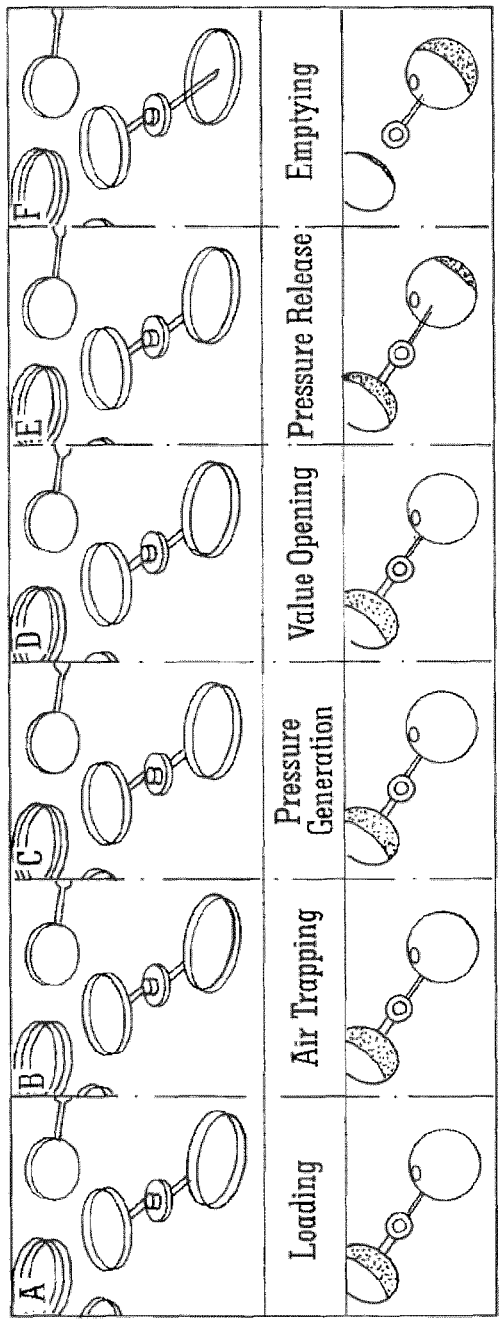
FIG. 5 shows sequential time frame operation of a device in accordance with the present teaching.

FIG. 5 shows in a sequential time frame fluid transfer in a centrifugal microfluidic device in accordance with the present teaching. While they are still intact, the dissolvable film forms a fluid barrier sealing the vertical through hole connecting the two channel layers (FIG. 5A). After priming of these dead-end channels with liquid, a gas pocket forms above the tab (FIG. 5C). This gas pocket is pressurized by the centrifugal field acting against the liquid plug ("valve closed") (FIG. 5C). At a critical spinning frequency, the inverted liquid-gas stack destabilizes and the liquid wets the film, thus dissolving the sacrificial membrane (FIG. 5D). Based on the differential between the first and second regions of the microchannel, the liquid can then protrude into the second lower region of microchannel ("valve open") (FIG. 5E). The dissolution time is tailored by the composition and thickness of the sacrificial film. In the representations of FIG. 5, A-C take place at 500 RPM-3500 RPM. D-F valve opens at 4000 RPM.

It will be appreciated that a configuration incorporating a vertical stacking arrangement whereby the sacrificial membrane is located in a plane substantially perpendicular to the direction of the induced centrifugal force facilitates manufacture of complex valve arrangements. Using such a stack arrangement it is possible to include other materials within the valve structure. Examples include functional membranes which may be integrated in the same way without significantly increasing the complexity of manufacture.

Figure 6:
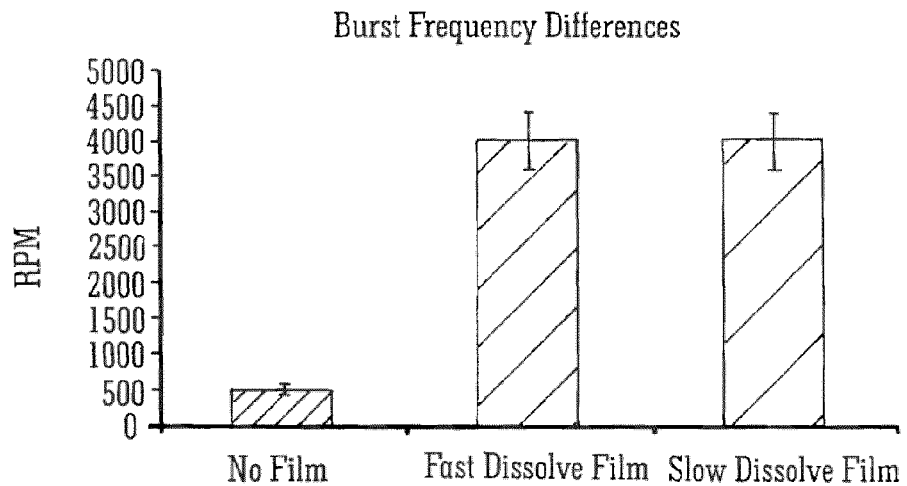
FIG. 6 shows how the burst frequency of a valve in accordance with the present teaching can be related to rotation of a substrate on which the valve is located.

It will be appreciated that the destruction of dissolvable layer occurs at a frequency of rotation of the device—herein referred to as the burst frequency. As shown in the graph of FIG. 6 experimentation confirmed that adding the air pocket within the device structure greatly increased the burst frequency of the valves: both the slow/quick dissolve retained even at 4000 RPM while designs without the plug, e.g. hydrophobic constrictions well known from the state-of-the-art, already yield near 500 RPM.

Such features are an improvement on the centrifugal platform as valving technologies that can withstand very vigorous hydrodynamic conditions enable processing (radially) above the valve while preserving downstream functionality. For instance the retention of the valves at such high-speeds shows potential for storing and withholding reagents throughout a series of spin protocols and opening on-demand at key operational times. This would be useful in such applications like clinical diagnostics where high-speed centrifugation is necessary for plasma separation from whole blood or vigorous mixing and homogenization steps. Valves retaining the regents/buffers required to analyse or process the components remaining in the supernatant, would be capable of holding until after the blood components are separated.

Figure 7:
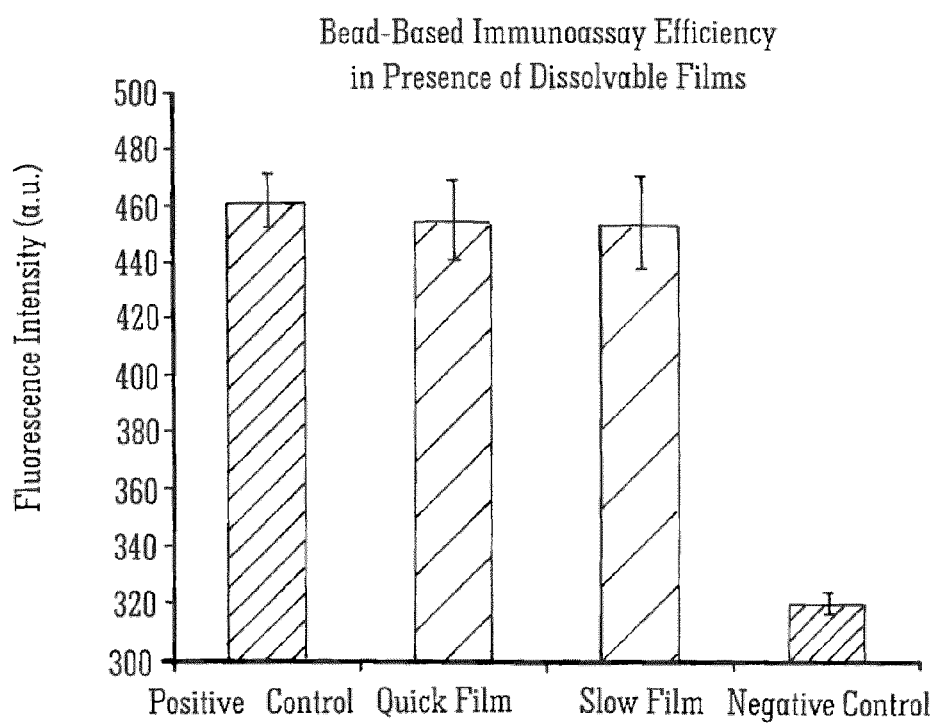
FIG. 7 shows examples of bead based immunoassay efficiencies in the presence of dissolvable films in accordance with the present teaching.

Microfluidic devices incorporating valves within the context of the present teaching are also useful for bioassays, e.g. immunoassays in clinical applications. To validate this FIG. 7 shows the results of data testing the efficacy of a device within the context of the present teaching. Specifically, a fluorescent immuno-binding assay was performed in the presence of the dissolved films to test the effects on binding of immunoglobulin G (IgG). To perform these tests, polystyrene particles 10 μm in diameter were functionalized with a goat-derived IgG using a streptavidin-biotin linkage; the commercially available particles arrived functionalized with streptavidin and the goat IgG arrived biotinylated. After the particles were coated with goat IgG, they were washed and then incubated with a fluorescently labelled anti-goat IgG. This IgG binding assay was performed in the presence and absence of the dissolved films. After a significant incubation time, the bead complexes were washed again and then fluorescence intensity measurements were taken using a microscope to quantity the efficiency of IgG protein binding. The analysis of the fluorescence response shows how the presence of the dissolvable films did not substantially affect protein binding, showed promising results. Both quickly and slowly dissolving films had almost identical intensities that were near the levels when no films were present. Additionally they both showed a signal much higher than the negative controls. Overall little to no inhibition was observed. This data supports the use of microfluidic device within the context of the present teaching in performance of immunoassays on a disc.

Figure 8:
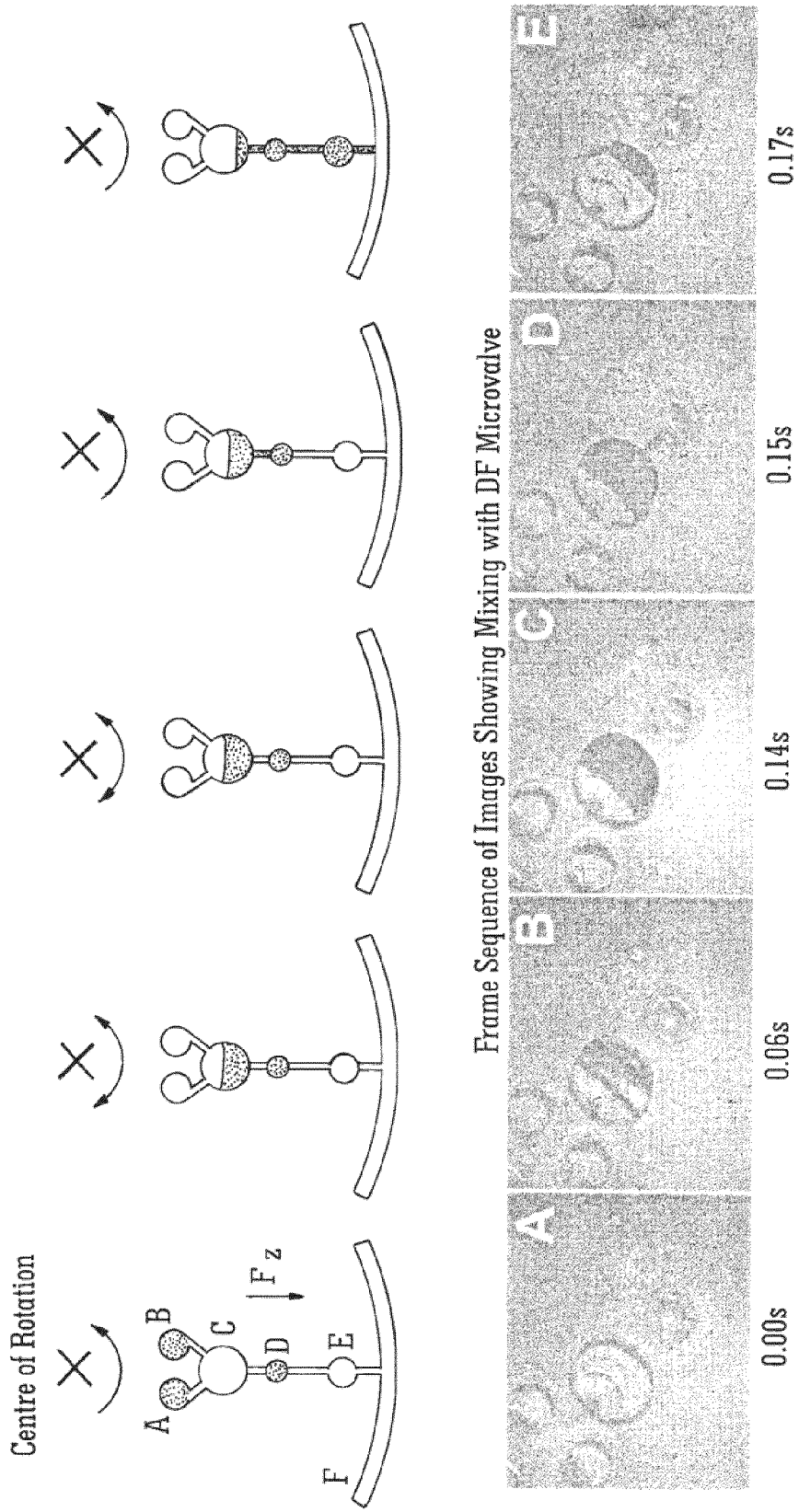
FIG. 8 shows how mixing of two or more fluids may be provided in accordance with the present teaching.

In the arrangements heretofore a valve has been described downstream of a single loading channel. FIG. 8 shows an alternative example whereby a device can be fabricated using valves to provide mixing on a microfluidic platform. In FIG. 8A liquid reagents were loaded in chambers A and B. FIG. 8B shows how reagents may be pumped into and held in chamber C due to the pneumatic pressure created by the valve placed in chamber D. In FIG. 8C, the reagents are mixed by a "shake" mode, i.e. cycles of vigorous rotational acceleration, whereby the disc on which the device is formed is rotated from side to side. In FIG. 8D by increasing the rotational frequency of the disc, mixed reagents are pumped into the pneumatic chamber D by increasing the rotational frequency (3500 RPM) of the disc. In FIG. 8E the contact of the liquid of the mixed reagent dissolves the sacrificial layer of valve and liquid is propelled further down the disc.

Figure 9:
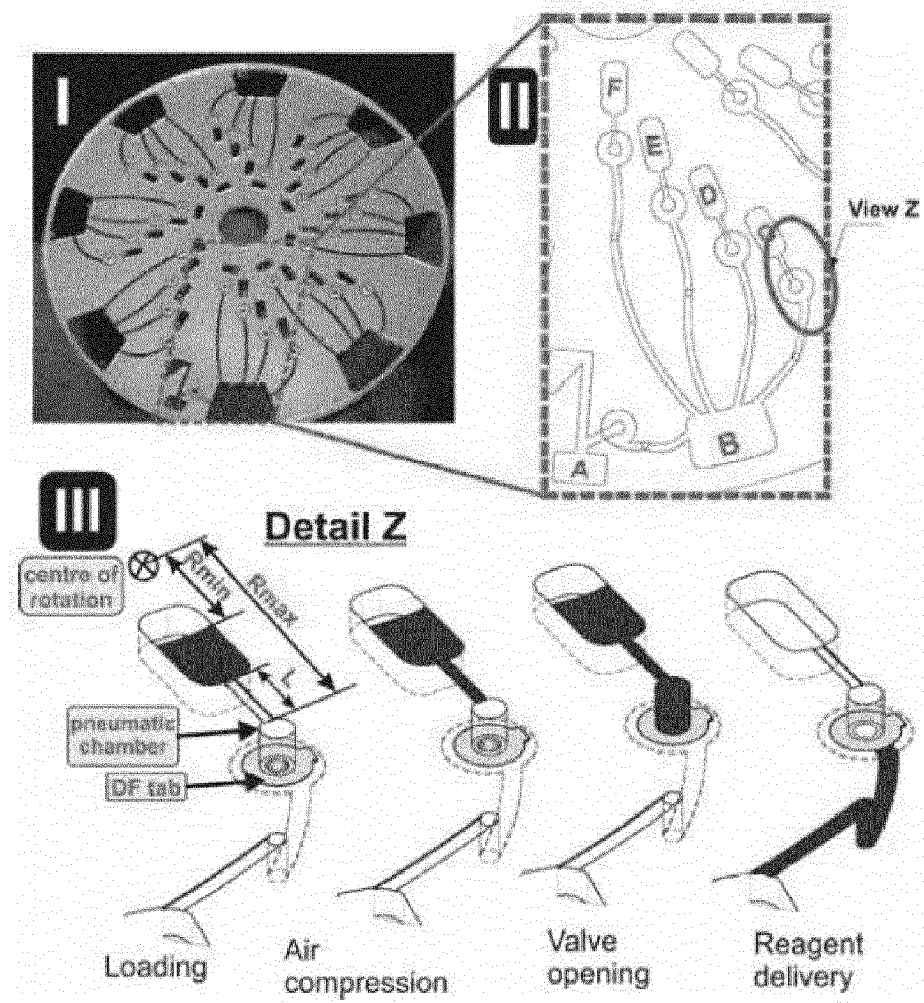
FIG. 9 shows an arrangement whereby a plurality of assay structures may be provided on a single rotatable disc.

FIG. 9 shows an arrangement whereby a plurality of assay structures may be provided on a single substrate. In the example of FIG. 9 which is an image of a fully assembled disc platform, 8 parallel assay structures are provided on a rotatable disc. In this exemplary arrangement a first structure is provided for a sample and the remaining seven are used for co-running calibrations standards. FIG. 9(II) shows an enlarged segment of a single-assay structure featuring blood separation (A), reaction chamber (B) and (C-F) reagent storage chambers. FIG. 9 (III) is a schematic of the DF valving technique with a sequence of sample loading, air compression, layer inversion/valve opening and reagent delivery through valve site.

In this exemplary arrangement a centrifugo-pneumatic, sacrificial and passive valving technique based on water-dissolvable films (DFs) may be provided. In accordance with the this example application of the present teaching a fully integrated and automated centrifugal microfluidic platform is provided and is capable of carrying out blood separation and sequential release of four different reagents (FIG. 9ii). In this rotationally actuated system, liquid is kept at bay from the valve site by means of a flow induced air pocket above the gas sealing valve. At increased rotational frequencies, a critical burst pressure is reached, during which the inverse, previously metastable gas-liquid stack flips to its low-energy state, i.e. the liquid resides farther away from the centre of the artificial gravity field than the gas. The liquid then enters the pneumatic compression chamber, thus displacing the induced air pocket and making contact with the DF membrane. The barrier film dissolves and liquid protrudes into the reaction chamber (see FIG. 9iii). All the assay steps were merely controlled by automatically varying the rotational frequency of the disc It will be appreciated that the use of the sacrificial layer valve represents a significant improvement on prior art efforts to provide mixing on a centrifugal platform as high-speed rotation can be performed without hindering other processes (as opposed to traditional passive valving techniques which can only withstand up to ~1000 RPM).

In another embodiment not shown in the above figures, the dissolvable film technology could be used in blood separation. In this application, whole blood is introduced in a chamber on the disc. A valve provided within the context of the present teaching is placed at the end of an exit channel connected to the blood separation chamber. A "slowly dissolving" film layer, which takes minutes to liquefy, will be in contact with whole blood during centrifugal sedimentation (under high speed sedimentation the process takes about 3 min). The pure, separated plasma, which would have been in contact with the valve, liquefies and thus opens the valve. Further pumping will propel the pure plasma through the valve site for further processing on the disc.

The valve technology of the present teaching can also be used for implementing a dilution function. The valve is placed in a pneumatic chamber connected to the dilution chamber. After adding dilution buffer to the sample in the dilution chamber, the diluted sample is propelled into the pneumatic chamber where it liquefies and opens the valve. Further pumping thus propels the liquid through the valve site for further processing.

In another application using a value in accordance with the present teaching, the valve is used to carry out a complete assay on a centrifugal microfluidic platform. In this application, the valves are sequentially placed at different positions on the disc where it is first used for blood separation, then mixing of reagent buffer and plasma extracted from whole blood. The reagent buffer and plasma are allowed to incubate. After incubation, they are propelled to the optical detection region, where incubation with capture antibody and optical detection occurs.

In another application using a value in accordance with the present teaching, is its use for on-board liquid storage. In this application, the valve placed in a pneumatic chamber connected to the liquid storage chamber provides both liquid and vapour barrier to the stored liquid. The liquid is stored in this chamber for as long as necessary, e.g. during shelf life. When the liquid is to be used, the disc is spun at the burst frequency of the pneumatic chamber; this releases the liquid into the pneumatic chamber where it liquefies the valve membrane. Further pumping propels it through the valve site for further processing.

In another exemplary application usefully exemplifies the application of the present teaching to biological assays it is possible to provide a fully automated homogeneous, i.e. solution-phase nitrate/nitrite fluorometric assay entirely through a rotational frequency protocol. One motivation of this particular assay is that it has been shown that elevated nitrate level in infants (<6 months old) could lead to shortness of breath and blue baby syndrome. Another motivation is that in the event of an accident, increased nitrate levels in the blood plasma and some tissues may also indicate traumatic brain injury. Nitric oxide (NO) undergoes a series of reactions with several biological fluids. The final products of NO in vivo are nitrate ($NO^-_3$) and nitrite ($NO^-_2$). However, their proportion in whole blood is small, so it is more common to determine the total $NO^-_3+NO^-_2$ and then $NO^-_2$ separately, and then calculate $NO^-_3$ from the difference. The present teaching provides an assay kit which provides an accurate measurement of total nitrate/nitrite concentration in a 2-step process. The first step is the conversion of nitrate to nitrite utilising nitrate reductase.

The second step is the addition of diaminonapthalene (DAN), provided as an acidic solution forming a product known as 1(H) naphthotriazole. NaOH solution is then added to the 1(H) naphthotriazole in order to enhance its fluorescence and to stop the enzymatic reaction. Measurement of the fluorescence of this compound accurately determines the nitrite concentration. Similarly, upon addition of the enzyme cofactor, the total nitrite plus nitrate content was determined. The nitrate content was then obtained by subtracting the nitrite content from the total nitrite plus nitrate content. Both standard curves were generated by following the user manual of a commercial assay protocol. A simplified schematic representation of this homogeneous assay is given in FIG. 10.

Figure 10:
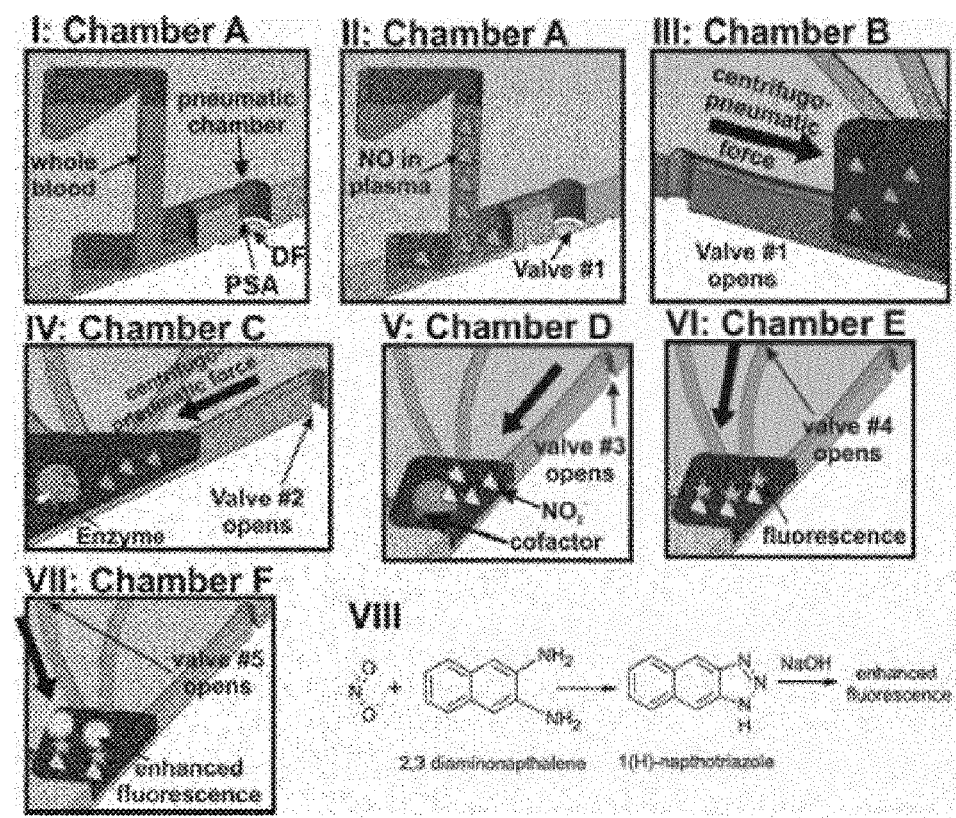
FIG. 10 is a schematic illustration of a homogeneous nitrate/nitrite assay showing the liquid-handling protocol and actuation of the DF valves

FIG. 10 shows in schematic form how the liquid-handling protocol and actuation of the DF valves may be provided with I) the pneumatic air compression chamber, DF tab with PSA support II) blood plasma separation and plasma containing NO III) valve #1 opens and releases the extracted plasma with NO to the reaction (rxn) chamber IV) valve #2 opens, delivering the enzyme (nitrate reductase) to the reaction (rxn) chamber. The enzyme is involved in the "key and lock" enzymatic reaction with NO V) valve #3 opens, delivering the enzyme cofactor to the rxn chamber. The enzyme cofactor activates the enzyme, thus triggering the conversion of NO to $NO^-_2$ VI) valve #4 opens, releasing DAN reagent to the rxn chamber. This reagent reacts with $NO^-_2$ to form a fluorescent product VII) valve #5 opens and releases NaOH to the rxn chamber, which then stops the enzymatic reaction and also enhances the fluorescence VIII) the reaction equation of the nitrate/nitrite formation chemistry.

In a homogeneous immunoassay, the antibodies, antigens and labelled antigens are mixed. The unbound and antibody-bound marked antigens can be distinguished by a change of activity of the marker when coupled. In this assay, the nitrate reductase reagent reduces the nitrate in the plasma to nitrite, when they are mixed. After this reduction reaction, the enzyme cofactor crosslinks with the nitrite and makes it an active enzyme which is fluorescently tagged by the DAN reagent. Addition of the NAOH solution enhances the fluorescence and the analyte is ready for detection. This reaction equation is given in FIG. 10viii.

Figure 11A:
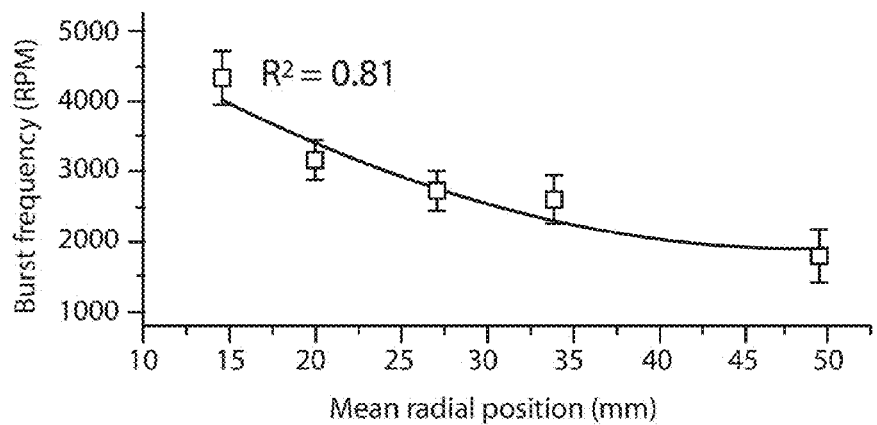
FIGS. 11A-11C are graphs demonstrating: decrease in burst frequency as (11A) the radial position of the DF valve on the disc platform increases, (11B) as the volume of the compressed air increases and (11C) as the exit channel length increases.
Figure 11B:
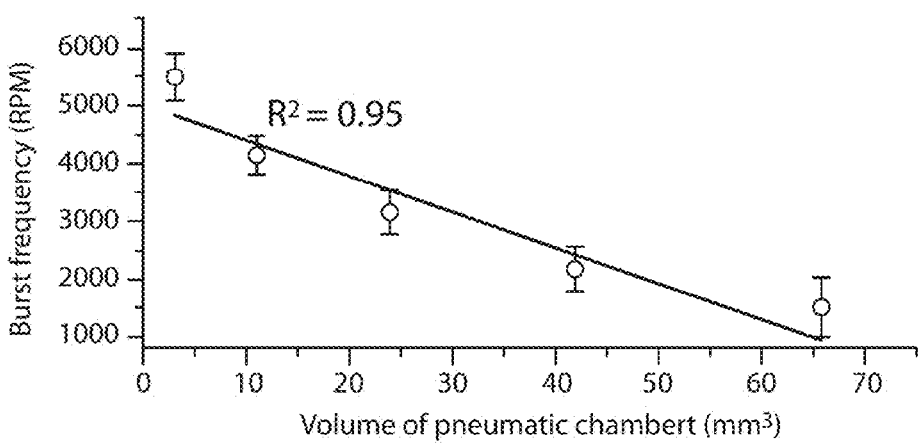
Figure 11C:
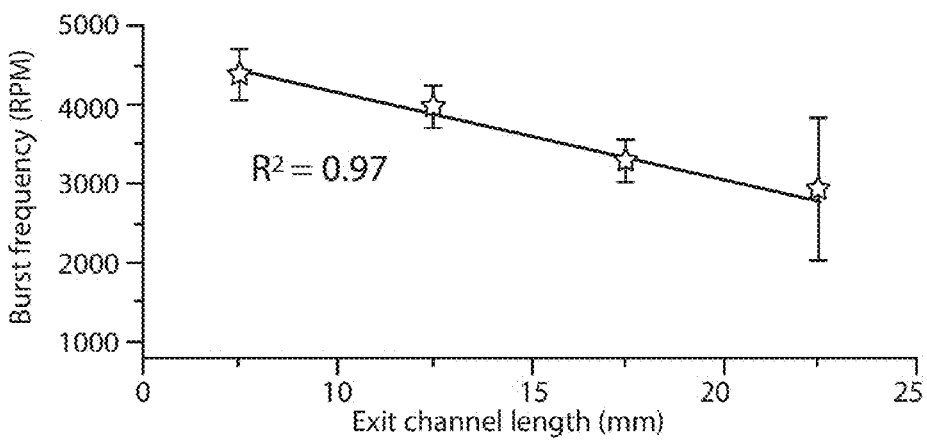
Figure 12:
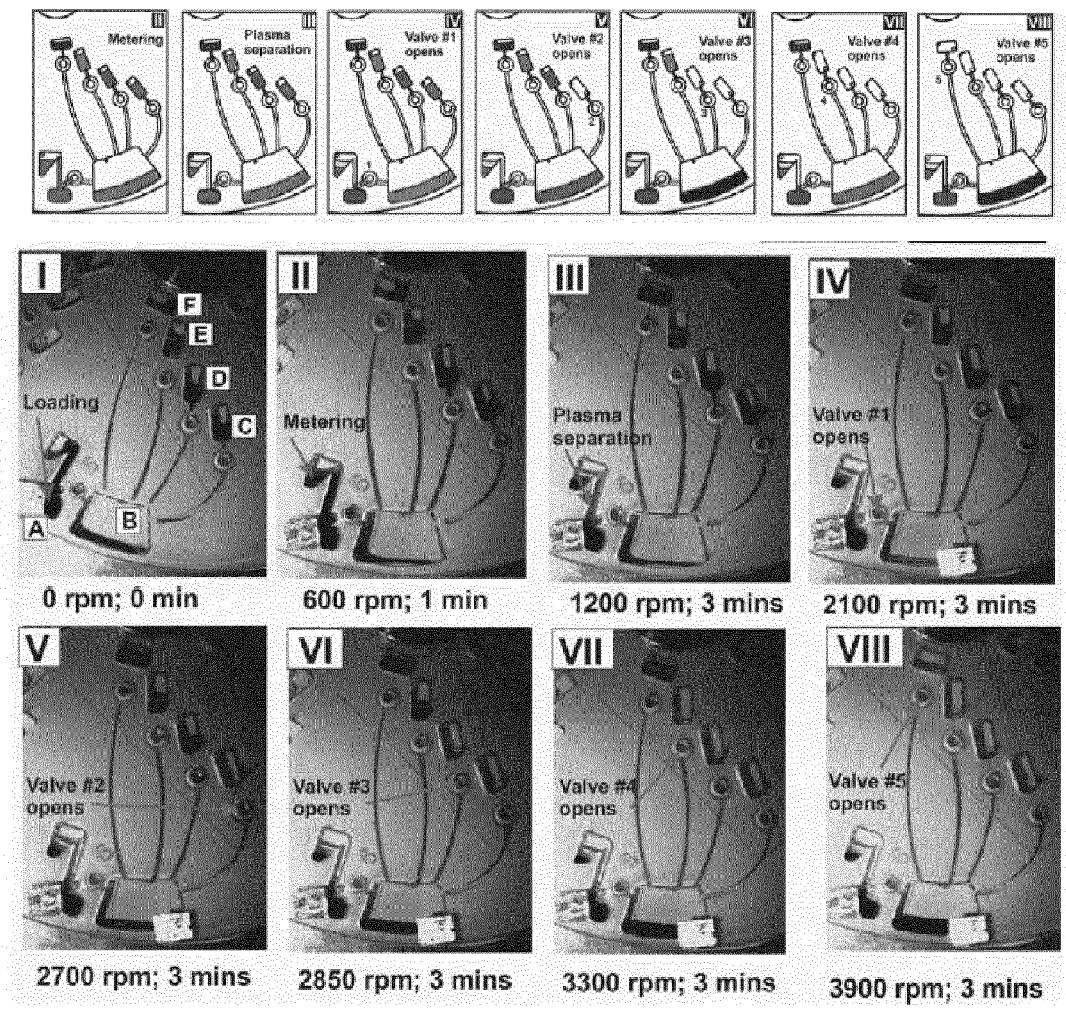
FIG. 12 is a schematic representation of the blood plasma separation, sequential reagent delivery and frame sequence of the DF valving technique demonstrating i) pre-loaded reagents and fresh whole blood sample ii) metering iii) blood plasma separation iv) valve #1 opening and plasma extraction v) valve #2 opens after 10 mins vi) valve #3 opens after 13 mins vii) valve #4 opens after 16 mins viii) valve #5 opens after 19 mins and then detection.

FIGS. 11A-11C show how a system provided in accordance with the present teaching may be tuned to allow selective activation of specific valves. The burst frequency necessary to effect a rupturing of the individual valves is dependent on a number of different factors including for example the radial position of the valve on the rotatable substrate (FIG. 11A), the volume of the pneumatic chamber (FIG. 11B) and the length of the exit channel (FIG. 11C). As shown in this experimental data there is a decrease in burst frequency as (a) the radial position of the DF valve on the disc platform increases, b) as the volume of the compressed air increases and (c) as the exit channel length increases. This knowledge can be used to design an arrangement which can selectively actuate individual valves. It will be appreciated therefore that in accordance with the present teaching it is possible to utilise the rotational burst frequency as the central control parameter for all (liquid bearing) valves on the centrifugal platform and to tailor the arrangement over a wide range of burst frequencies. Using such an arrangement it is possible to implement a spin protocol. For example the present inventors have provided a fully integrated, merely rotationally actuated, multi-step bio-assay incorporating multiple valves which have different burst pressures and hence responsive to different burst frequencies. For example using 5 valves which are independently actuable it is possible to fully integrate and rotationally automate a homogeneous bioassay including blood separation, plasma extraction and sequential release of four different reagents.

Step 1. The first step is to meter the whole blood sample, by spinning the disc at 600 RPM for 1 min, leaving 65 microliters of blood in a first chamber.

Step 2. The disc is then spun at 1200 RPM for 3 min to sediment the red blood cells and separate plasma.

Step 3. After this plasma separation step, the rotational frequency is increased to 2100 RPM in order to open a first valve #1, thus releasing 10 microliters of plasma into the first chamber (reaction chamber), which has already been preloaded with 70 microliters of assay buffer.

Step 4. The enzyme in from an enzyme storage chamber is released into the reaction chamber at 2700 RPM, while in Step 5, the cofactor is added to the same chamber at 2850 RPM. At this stage the assay requires an incubation step to sufficiently mix plasma+assay buffer+enzyme cofactor+nitrate reductase.

Step 6. To this end the disc was alternatingly spun in a clockwise and anticlockwise sense of rotation at an amplitude of 600 RPM for 3 min.

Step 7. Upon increasing the rotational frequency to 3300 RPM, the DAN reagent was released from chamber E into the reaction chamber.

Step 8. Subsequently, NaOH was added to the same reaction chamber at a frequency of 3900 RPM from chamber F. The NaOH solution terminates the enzymatic reaction and also amplifies the fluorescence signal.

It will be appreciated that the foregoing exemplifies applications of the present teaching whereby DF valves in accordance with the present teaching can be configured to yield at a geometrically well-defined burst frequency which can be tailored over a wide range of spin rates by the radial position of the valve on the disc, the volume of the entrapped air in the pneumatic compression chamber and the length of their inlet channel. Due to the broad range and sharp definition of burst frequencies, the present inventors have integrated and automated a comprehensive multi-step, assay protocol including the sequential release of 4 reagents by merely rotationally actuated dissolvable-film (DF) based centrifugo-pneumatic valving scheme. The exemplary application of detection of nitrate/nitrite starting at clinically relevant concentration in whole blood of donors shows results which are in good quantitative agreement with results obtained by running the assay on a regular well plate.

Figure 13:
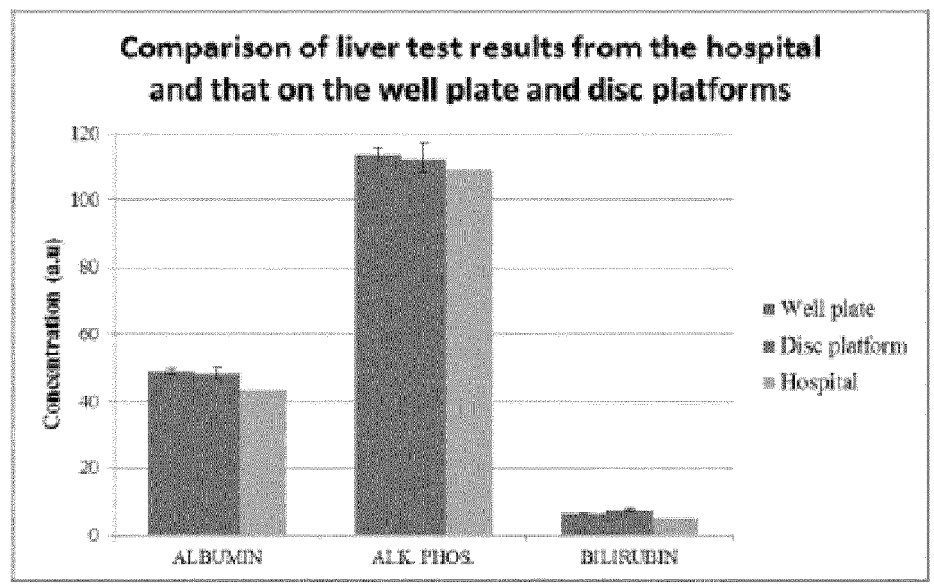
FIG. 13 is a graph showing data from three different tests.

Other example applications include the integration and automation of a liver assay panel (LAP). Experimental results in accordance with the present teaching have provided a concurrent running of several biological assays (albumin (ALB), alkaline phosphatase (ALP), gamma glutamyl transferase (GGT), total serum protein (PROT), total (TBIL) and direct (DBIL) bilirubin on whole blood. Multiple independently actuated valves may be incorporated onto a single platform and actuated using a range of spin rates spanning between 10 Hz and 60 Hz. Similarly to the other described applications, an air pocket is trapped above the DF tab; and by increasing the spin rate of the disc, a geometry-dependent burst pressure is reached at which the air pocket destabilizes and the valve is opened upon contact of the membrane with the intruding liquid. FIG. 13 shows how accurate results from a platform implemented in accordance with the present teaching vis a vis two other standard techniques can be.

Figure 14:
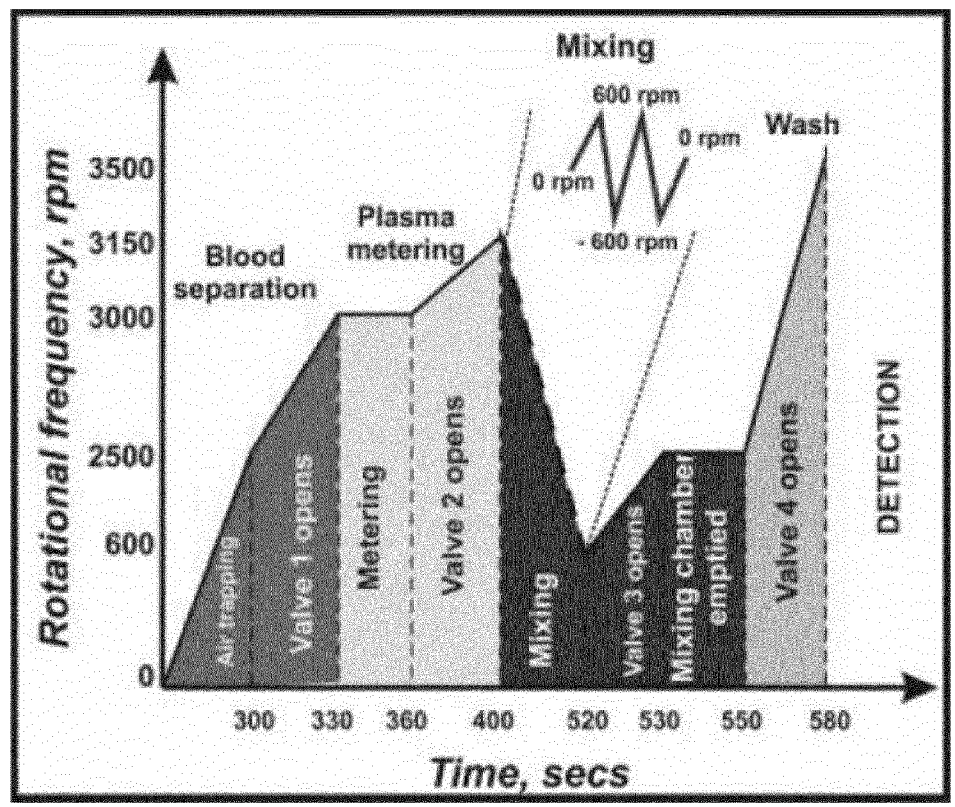
FIG. 14 shows a graphical representation of the fully integrated disc showing the different stages and the variation in the disc rotational frequency.

FIG. 14 shows an example of integration and automation of a multi-step immunoassay protocol which is merely based on rotationally actuated, immunoassay compatible DF valves. The different stages and the variation in the disc rotational frequency are evident and the extract from the stage shows the zig-zag shake mode process that facilitates efficient mixing/incubation The high burst frequencies of up to 3500 RPM, which is about 3-fold higher than common capillary valves, permits rapid blood sedimentation while the vapour-barrier properties of the sacrificial material allow on-board storage and controlled release of liquid reagents.

Also the vapour barrier properties the DF valves have been successfully tested showing capacity of storage of fluids for time periods in excess of one week.

Figure 15:
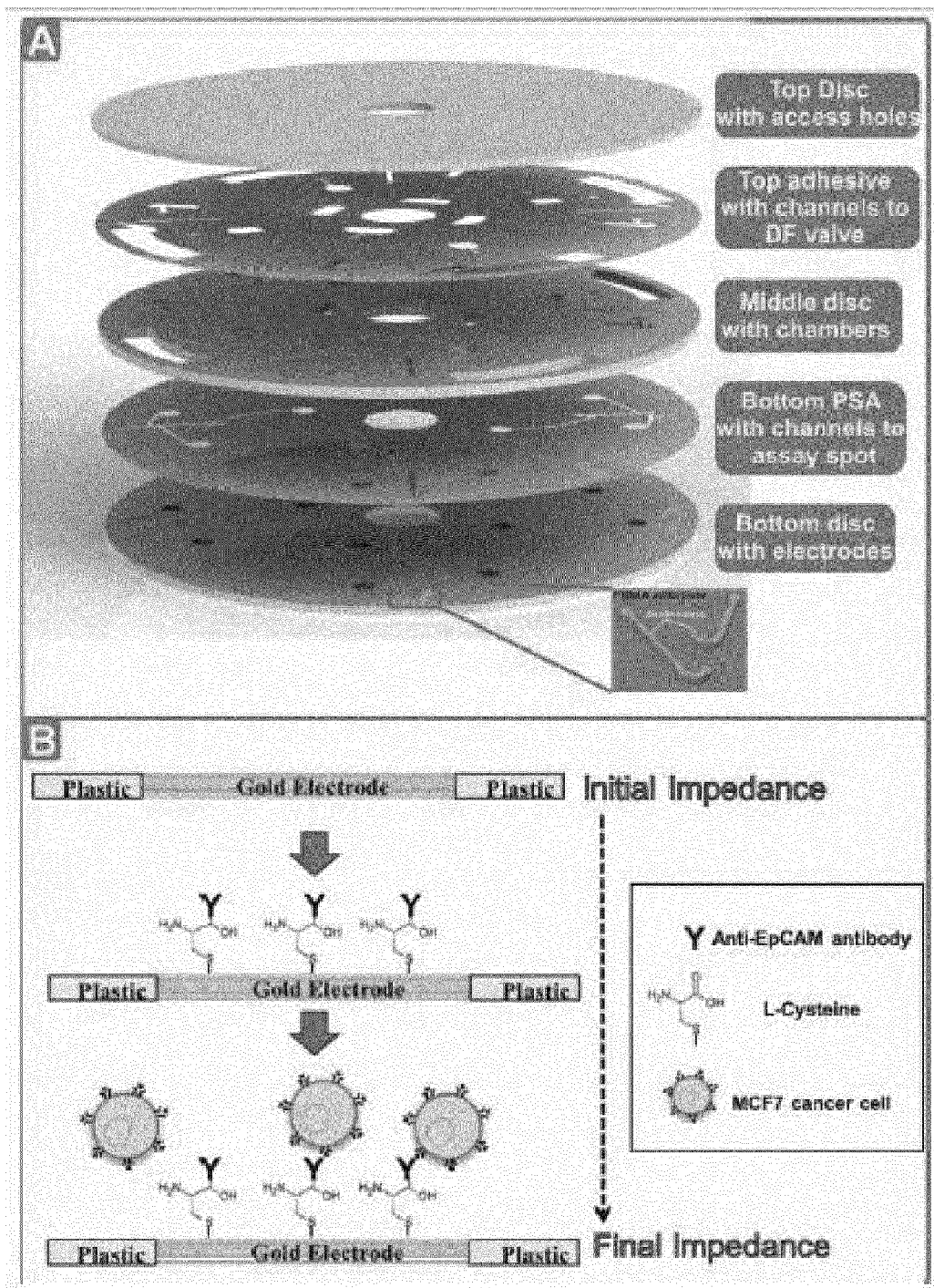
FIG. 15 shows an exploded view of an exemplary disc provided in accordance with the present teaching incorporating integrated electrodes.

FIG. 15 is an example of a disc in accordance with the present teaching incorporating one or more integrated electrodes. Such a device has a number of applications. For example it is possible to provide an electrochemical detection of MCF7 breast cancer cells using DF-based centrifugal microfluidic channels through the integration of ~50-nm thick gold electrodes on a plastic substrate. On this platform, a fully integrated system capable of blood separation, extraction, capture and electrochemical detection of the MCF7 breast cancer cells onto the surface of EPCAM can be provided. A multi-layer disc such as shown in FIG. 15 can be provided and by patterning an electrode using for example gold by physical vapour deposition it is then possible to immobilise anti-EpCAM antibody (Ab) on the gold electrodes. The antibody coated gold electrodes were studied and experimental data demonstrates that due to the presence of specifically captured cancer cells, the diffusion of FeOH redox probe to the surface of the electrode is hindered and the current drops from 2.1 µA to 1.78 µA. Impedance measurements show that there is also a significant increase in the admittance on cell capture which demonstrates electrochemical detection of MCF7 breast cancer cells on a rotationally actuated DF-based centrifugal platform. This revolutionary point-of-care platform is capable of carrying out a multi-step immunoassay starting from whole blood for the specific capture and sensitive label free detection of cancer cells.

It will be appreciated therefore from the above that the use of the hybrid films in accordance with the present teaching for valving has applications for a range of microfluidic designs including both stationary and centrifugal arrangements. Particularly, centrifugal based systems are enhanced by dissolvable-film based valving; for example mixing, blood separation, metering, phase separation, dilution, on-board liquid storage, etc.

By providing a valve comprising dissolvable films to form efficient barriers for liquid flow; until the films are in direct contact with liquid reagents the seals between regions of the device are fully maintained. No separate actuation of the valve is required as the same pumping mechanism driving the flow also actuates the valve. The sacrificial valves described here are of particular interest for a range of applications; for example as programmable flow control elements and as vapour barriers for on-board liquid reagent storage. Within the context of the present teaching it will be appreciated that it is the direct contact of the liquid with the membrane that causes the rupturing of the membrane. The liquid does not flow through an already opened valve, the liquid causes an opening of the valve. In this way the gas pocket which is initially provided between the liquid and the membrane delays the contact of the liquid with the membrane. The increase in pressure of the gas during the actuation process may cause a stretching of the membrane, but it does not necessarily effect a breaking of the membrane. The device is configured such that before the membrane is stretched to a breaking point, the gas is displaced away from the membrane allowing the liquid to come into contact with the membrane and effect the opening of the fluid passage way between the two sides of the valve. The stretching of the membrane may shorten the time period which the liquid needs to be in contact with the membrane to effect a dissolving of the membrane, but liquid contact is required.

It will be appreciated from the above that a valve provided in accordance with the present teaching is advantageous at least in that it:

1) Readily integrates with mass production techniques

The valving tabs can be premade and placed into the system at multiple points along the fabrication/assembly of a device. As opposed to methods like wax valving no special machinery is needed to keep waxes at liquid temperature for dispensing. Also (moderate) heating of the device, e.g. for running thermally controlled reactions, would be possible without compromising the integrity of the valves.

2) Eliminates the need for peripheral actuation mechanisms.

The rotational control of the sample liquid itself is the mechanism for actuation. As opposed to methods like wax valving no special machinery (peripheral or otherwise) is needed, e.g. to heat the waxes for actuation. In the variant where the liquid is initially separated from the valve by a pocket, the actuation is implemented by the same actuator which propels the liquid through the microfluidic chip, e.g. a pump or a centrifugal field.

The words comprises/comprising when used in this specification are to specify the presence of stated features, integers, steps or components but does not preclude the presence or addition of one or more other features, integers, steps, components or groups thereof.

The invention claimed is:

1. A microfluidic device comprising:
   a fluid channel comprising a first and a second region separated by a valve, the first region being upstream of the valve and the second region being downstream of the valve,
   the valve comprising a sacrificial membrane which on contact with a liquid dissolves to establish a fluid path from the first to the second region,
   a gas pocket region provided within the first region and adjacent to the sacrificial membrane, the gas pocket region being dimensioned to receive and retain a gas volume on introduction of a liquid into the first region of the channel; and
   the device being operably coupled to and responsive to drive means to operably induce flow from the first region towards the second region, actuation of the drive means operably displacing a defined gas volume within the gas pocket away from the sacrificial membrane and allowing the liquid to come into contact with and effect dissolution of the membrane, the membrane being intact prior to contact with the liquid.

2. The device of claim 1 wherein the drive means is configured to provide centrifugally induced artificial gravity conditions.

3. The device of claim 1 wherein the sacrificial membrane comprises a liquid dissolvable film.

4. The device of claim 3 wherein the liquid dissolvable film is formed from one or more of cellulose derivatives, hydrocolloids, acrylate copolymers, gums, polysaccharides, plasticizers or the like.

5. The device of claim 3, wherein the valve has an actuation rate dependent on a rate of breakdown of the gas pocket and a subsequent dissolving rate of the sacrificial membrane.

6. The device of claim 1 wherein on operable priming of the device with a liquid, the gas pocket region is defined at a first boundary by a meniscus of the liquid within the first region and at a second boundary by the sacrificial membrane.

7. The device of claim 1 comprising a gas outlet in the vicinity of the valve, activation of the drive means operably effecting an increase in an induced pressure causing the gas volume within the gas pocket to dissipate to the gas outlet and bringing the liquid into contact with the sacrificial membrane.

8. The device of claim 7 wherein the gas outlet is a hydrophobic gas outlet.

9. The device of claim 7 wherein the gas outlet leads to free atmosphere, or to a compression chamber.

10. The device of claim 7 wherein the sacrificial membrane is at least partially gas permeable such that gas within the gas pocket may pass through the sacrificial membrane.

11. The device of claim 1 wherein the cross sectional area of the channel in the region of the valve is configured such that the presence of gas within the gas pocket between the liquid and the valve is retained until such time as valve actuation is required, activation of the drive means operably effecting an increase in a centrifugally induced pressure causing the gas within the gas pocket to dissipate and bringing the liquid into contact with the sacrificial membrane.

12. The device of claim 1 wherein the device is formed at least partially from a breathable substrate to retain the presence of the gas pocket between the liquid and the valve until such time as valve actuation is required, and thereafter where activation of the drive means operably effecting an increase in centrifugally induced pressure causing the gas pocket to dissipate through a degassing principle and bringing the liquid into contact with the sacrificial membrane.

13. The device of claim 12 provided initially within a sealed environment, operable removal of the device from the sealed environment causing an induced suction by passage of air through the breathable substrate.

14. The device of claim 1 configured such that the gas pocket is operably retained in place between an advancing liquid and the valve until such time as the pressure exerted by the advancing liquid is sufficient to disrupt a metastable stacking of the liquid plug and the gas pocket.

15. The device of claim 1 provided on a rotatable substrate.

16. The device of claim 15 wherein the valve has a burst pressure at which the valve will actuate and allow fluid communication between the first and second regions, the burst pressure being related to a frequency of rotation of the rotatable substrate such that operably increasing the frequency of rotation of the rotatable substrate above a threshold value will effect a bursting of the valve.

17. The device of claim 1 provided as a multilayer structure, the first and second regions of the channel being provided in first and second layers of the device, the first region being located above the second region.

18. The device of claim 17 wherein the first and second regions each have a major axis that is parallel with the direction of a force providing an induced liquid flow.

19. The device of claim 17 wherein each of the regions are in fluid communication with one another through a vertical through hole, the valve being located within or adjacent to the through-hole and preventing passage of a fluid through the through hole.

20. The device of claim 19 wherein the sacrificial membrane is perpendicular to a major axis of each of the first and second regions.

21. The device of claim 20 comprising one or more functional membranes stacked relative to the sacrificial membrane.

22. The device of claim 20 wherein the gas pocket is located above the sacrificial membrane.

23. The device of claim 19 provided on a rotatable substrate and wherein, prior to actuation of the drive means, the sacrificial membrane and gas pocket form a liquid-gas stack which at a determined frequency of rotation of the substrate inverts so as to allow a fluid within the first region to come into contact with and wet the sacrificial membrane.

24. The device of claim 1 wherein the valve comprises a multi-layer functional film configuration, a first layer of the valve comprising the sacrificial membrane and a second layer of the multi-layer functional film comprising an adhesive film.

25. The device of claim 24 wherein the adhesive film is a pressure sensitive adhesive film.

26. The device of claim 24 wherein the sacrificial membrane is provided on the adhesive film.

27. The device of claim 24 wherein the adhesive film comprises a through hole which on assembly of the valve is blocked by the sacrificial membrane and which on actuation of the valve provides fluid communication from a first side of the valve to a second side of the valve.

28. The device of claim 1 wherein the gas volume within the gas pocket is operably formed during a priming of the device with a liquid.

29. The device of claim 1 wherein the sacrificial membrane comprises a dissolvable polymer.

30. The device of claim 1 comprising a capture chamber downstream of the valve, the capture chamber configured to receive and retain debris resultant from a dissolving of the sacrificial membrane.

31. The device of claim 30 wherein the capture chamber has a mouth that is offset from a major axis of the force induced by the drive means.

32. The device of claim 30 wherein the capture chamber has a mouth that is parallel with a major axis of the force induced by the drive means.

33. The device of claim 1 wherein the sacrificial membrane is configured to disintegrate upon experiencing a predetermined pressure.

34. The device of claim 33 wherein the predetermined pressure is determined with reference to action of the drive means on the fluid provided upstream of the sacrificial membrane.

35. The device of claim 1 comprising a plurality of valves, individual valves being responsive to different burst frequencies such that a rotation of the device at different frequencies independently actuates selected ones of the plurality of valves.

36. The device of claim 35 wherein the plurality of valves are arranged at distinct radial positions on the device.

37. The device of claim 1 comprising a plurality of micro fluidic channels configured to be in fluid communication with one another, the flow of a fluid between the channels being operably controlled by a plurality of valves located within a flow path between the channels and wherein a first valve is responsive to a first burst frequency and a second valve is responsive to a second burst frequency such that selective rotation of the device controls the selective actuation of individual valves and the subsequent flow of a fluid through the plurality of micro fluidic channels.

38. The device of claim 1 configured such that during operation the drive means causes the gas pocket to initially induce a pressure against the membrane so as to stretch the membrane prior to the gas pocket moving away from the sacrificial membrane and allowing the liquid to come into contact with and effect dissolution of the membrane.

39. A microfluidic system comprising a device, the device comprising:
a fluid channel comprising a first and a second region separated by a valve, the first region being upstream of the valve and the second region being downstream of the valve,
the valve comprising a sacrificial membrane which on contact with a liquid dissolves to establish a fluid path from the first to the second region,
a gas pocket region provided within the first region and adjacent to the sacrificial membrane, the gas pocket region being dimensioned to receive and retain a gas volume on introduction of a liquid into the first region of the channel; and
drive means configured to operably induce flow from the first region towards the second region, actuation of the drive means operably displacing a defined gas volume within the gas pocket away from the sacrificial membrane and allowing the liquid to come into contact with and effect dissolution of the membrane, the device being provided on a rotatable substrate, the system comprising a motor configured to provide the drive means of the device; the system further comprising means to measure in situ the dimensions of the gas volume within the gas pocket region formed within the channel of the microfluidic device.

40. A cancer detection system comprising:
a fluid channel comprising a first and a second region separated by a valve, the first region being upstream of the valve and the second region being downstream of the valve,
the valve comprising a sacrificial membrane which on contact with a liquid dissolves to establish a fluid path from the first to the second region,
a gas pocket region provided within the first region and adjacent to the sacrificial membrane, the gas pocket region being dimensioned to receive and retain a gas volume on introduction of a liquid into the first region of the channel;
drive means configured to operably induce flow from the first region towards the second region, actuation of the drive means operably displacing a defined gas volume within the gas pocket away from the sacrificial membrane and allowing the liquid to come into contact with and effect dissolution of the membrane.

* * * * *